United States Patent [19]

Asami et al.

[11] Patent Number: 5,062,044
[45] Date of Patent: Oct. 29, 1991

[54] TEMPORARY BUS MASTER FOR USE IN A DIGITAL SYSTEM HAVING ASYNCHRONOUSLY COMMUNICATING SUB-SYSTEMS

[75] Inventors: Takashi Asami, Huntington Beach; Rajni N. Doshi, El Toro, both of Calif.

[73] Assignee: Western Digital Corporation, Irvine, Calif.

[21] Appl. No.: 102,542

[22] Filed: Sep. 29, 1987

[51] Int. Cl.⁵ .................. G06F 13/00; G06F 13/12; G06F 13/362; G06F 13/40
[52] U.S. Cl. ............................ 364/200; 364/228; 364/240; 364/240.2; 364/240.5; 364/240.8
[58] Field of Search ... 364/200 MS File, 900 MS File

[56] References Cited

U.S. PATENT DOCUMENTS

| | | | |
|---|---|---|---|
| 4,245,301 | 6/1981 | Rokutanda et al. | 364/200 |
| 4,365,294 | 12/1982 | Stokken | 364/200 |
| 4,495,573 | 1/1985 | Ballegeer | 364/200 |
| 4,587,609 | 5/1986 | Boudreau et al. | 364/200 |
| 4,817,037 | 3/1989 | Hoffman et al. | 364/200 |

Primary Examiner—Thomas C. Lee
Assistant Examiner—Robert B. Harrell
Attorney, Agent, or Firm—Christie, Parker & Hale

[57] ABSTRACT

A circuit embodied in a single integrated circuit, which is connected through an asynchronous communication bus to a primary bus master and a permanent bus slave, cooperates with the master and slave in a multi-master transfer of a block of data having a leading sub-block of data followed by a trailing sub-block of data. The slave operates in accord with request/acknowledge protocol by applying at least one request signal to a conductor of the bus and responding to each of a consecutive sequence of acknowledge signals on a second conductor of the bus from the master in communication of each of a consecutive sequence of concurrently-applied parallel-by-bit data carried by multiple other conductors that define a data bus portion of the communication bus. The circuit selectively responds to each of a predetermined number of acknowledge signals from the master during communication of the leading sub-block, by copying each data item of the leading sub-block, so that the leading sub-block is distributed to the circuit as it is communicated between the master and the slave. The circuit selectively responds to request signals by applying a second predetermined number of acknowledge signals to the second conductor while participating in communication of each data item of the trailing sub-block. A bi-directional buffer receives the acknowledge signals during the transfer of the leading sub-block and applies the acknowledge signals during the transfer of the trailing sub-block.

21 Claims, 4 Drawing Sheets

TEMPORARY BUS MASTER FOR USE IN A DIGITAL SYSTEM HAVING ASYNCHRONOUSLY COMMUNICATING SUB-SYSTEMS

BACKGROUND OF THE INVENTION

This invention relates to a temporary bus master for use in a digital system having asynchronously communicating sub-systems.

An important issue in defining the architecture of a complex digital system is how to provide control over communication among individual sub-systems. Such individual sub-systems are generally subject to local timing constraints that make it impractical to rely on a global clock to synchronize all communication from one sub-system to another. This applies not only where each sub-system is housed on a separate printed circuit board as in an exemplary case of a motherboard with circuitry defining a central processing unit and another board with circuitry defining a peripheral controller, but also where each sub-system is embodied in an individual integrated circuit on the same printed circuit board. In either case, an asynchronous communication protocol is essential for coordinated operation of the individual sub-systems.

Numerous matters need to be considered in defining a complete asynchronous communication protocol. For example, one major consideration is how, within a sender, it can be determined at any point in time whether the sender can apply signals on its output to send a message. Another example of such a major consideration is how, within a receiver, it can be determined at any point in time whether signals at its input represent a message. The relative simplicity or complexity of a protocol depends in part on the approach taken in interconnecting the sub-systems. There are various such interconnection approaches that can be considered in terms of a spectrum. At one end of the spectrum is an approach that is sometimes referred to as point-to-point interconnection; at the opposite end of the spectrum is another such approach that is sometimes referred to as a shared asynchronous communication bus. In a point-to-point interconnection at one end of the spectrum, there is no sharing of either conductors used for data items to be communicated or conductors used for control signals by which communication is coordinated. In a fully shared asynchronous communication bus at the opposite end of the spectrum, all the conductors are shared. A middle approach involves sharing of conductors used for data items, but point-to-point interconnection of conductors used for communication-control signals.

As general matter, it is desirable to minimize the number of conductors used for interconnecting sub-systems. One reason for desiring to minimize the number of such conductors relates to packaging, particularly limitations on the number of pins that can be used for an integrated circuit chip. In this regard, a microprocessor that is used in many personal computers and commonly called an 8086 microprocessor has only forty pins. To use this microprocessor in its maximum mode, it is connected to a separate bus controller called an 8288 bus controller. When the 8086 microprocessor is used with the 8288 bus controller, some of the precious few pins of the 8086 microprocessor are reallocated to participate in other desirable functions. One of these reallocated pins is used in the minimum mode of operation for a bus control signal called Address Latch Enable (ALE). The foregoing example is representative of a general rule that pins are at a premium, especially for large-scale integrated circuits.

One well known protocol can briefly be called request/acknowledge protocol. In implementing this protocol, a first conductor carries request signals that in accord with this protocol are applied to the first conductor only by a slave, and a second conductor carries acknowledge signals that in accord with this protocol are applied to the second conductor only by a master.

When a slave seeks to participate in communication with the master, whether to send or receive a parallel-by-bit data item such as an 8-bit byte, or a 16-bit word, or the like, the slave asserts the request signal. Upon detecting that the request signal is asserted, the master asserts the acknowledge signal at least once to indicate it is ready to receive or send the data item. In a burst mode of communication, the slave continuously asserts the request signal throughout an interval during which a series of data items are communicated, one data item per acknowledge signal. In an interlock mode of communicating, the slave asserts the request signal for each data item.

The request/acknowledge protocol can be used for communication between as few as two integrated circuits interconnected in accord with the point-to-point approach, and for communication over a shared bus.

Where this request/acknowledge protocol is followed in a fully shared bus in which all conductors of the bus are shared, two bus slaves connected to the bus cannot directly communicate with each other. Rather, every bus slave communicates directly only with the bus master. Some systems include an arrangement in which a Direct Memory Access (DMA) controller is provided. Such a DMA controller and a microprocessor can time share the task of being the bus master. In such a system, the microprocessor surrenders control over the bus to the DMA controller for such an indefinite interval of time as is required for a communication task, and whenever that task is finished, the DMA controller surrenders control over the bus back to the microprocessor.

While the microprocessor controls the bus, the DMA controller does not participate in any communication between the microprocessor and a bus slave. Likewise, while the DMA controller controls the bus, the microprocessor does not participate in any communication between the DMA controller and a bus slave.

Certain block communication tasks are difficult to accomplish rapidly and economically with any previously known architecture. In general terms, such a block communication task involves multiple sub-systems in which a first one of the sub-systems needs to receive a leading sub-block of data items that also needs to be received by another one of the sub-systems, and further in which the first sub-system also needs to participate, whether as a sender or receiver, in communication of a trailing sub-block of the same block. An example of such a circumstance involves a disk drive controller. A disk drive controller performs numerous tasks incident to the writing and reading of data onto and from a disk. One such function is to provide serial-by-bit communication with the disk, which entails local timing constraints and particular format constraints dictated by the particular specifications of the disk drive and the way in which data is stored in sectors within tracks, and so forth.

For numerous reasons, the serial-by-bit communication with the disk is block organized wherein every access to the disk entails a data transfer of at least one block and sometimes an integral number of blocks, with a block typically being coextensive with the storage capacity of a sector. Another such function is a serializer/deserializer (SERDES) function. While writing data to disk, the SERDES function involves converting parallel-by-bit data items such as 8-bit bytes into a serial-by-bit signal for use in writing data on the disk. While reading data from the disk, the SERDES function involves converting the serial-by-bit signal read from the disk to parallel-by-bit data items. Numerous formatter chips are well known and commercially available for performing the foregoing and associated functions as an interface device for the disk drive.

Another function of a disk drive controller is to provide buffer memory. Numerous buffer manager chips and memory chips are well known and commercially available for providing such buffer memory.

In some circumstances, it is desirable for the disk drive controller to provide an additional function that entails two main steps, one being to generate data items and the other being to append the generated data items as a trailing sub-block within a block. This is particularly desirable for a high performance disk drive controller for a large capacity disk drive such as an optical disk drive.

A requirement for generating such data items can arise in implementing a disk addressing technique for avoiding access to sectors of the disk that have been found defective. In such a case, the generated data items define a linked list. Alternatively, or in addition, another requirement for generating such data items can arise in implementing an error correction technique. In such a case, the data items generated during a write operation are error correction codes (ECC codes). Such ECC codes that form a trailing sub-block are data-dependent items; that is, their values depend upon the particular data defining the leading sub-block. During a read operation, in which an error-correction technique such as Reed-Solomon error-correction is involved, there needs to be generated first a set of syndromes based on a block of data items read from the disk, and then, based on such syndromes, there needs to be generated other data items for use in making corrections to any errors in the leading sub-block.

In any such case, the complexities of the functions involved may make it essential to provide at least three integrated circuit chips such as a buffer manager chip, an ECC chip, and a formatter chip that need to communicate with each other. In considering a point-to-point interconnection at one end of the spectrum as a candidate architectural feature of such a system, the following problems appear. First, the ECC chip would have to be connected as the middle element of a tandem arrangement, and would have to have one set of pins for communicating with the buffer manager chip and another set of pins for communicating with the formatter chip. Second, the ECC chip would have to have a large first-in, first out (FIFO) memory. In particular, that FIFO memory would have to be deep enough so that during a block transfer for a disk write operation it could hold an entire block including the leading sub-block of data items that it would pass on to the formatter after it had computed the data-dependent ECC codes for the trailing sub-block. Third, this would involve a block latency.

Considering a bus structure as a candidate architectural feature of such a system presents a complex problem as to providing other architectural features that become necessary to support use of a shared bus for coordinated communication. The issues that need to be resolved in defining the architecture for this system involve both writing to disk and reading from disk. With respect to writing to disk, there are issues as to providing a way within the formatter and a way within the ECC generator to determine the particular points in time that the data bus carries parallel-by-bit data items sent by the buffer manager to define the leading sub-block of a block to be written to disk. Further, a way has to be provided to determine when the ECC generator can and must start sending the sequence of ECC codes to the formatter. The complexity of this problem is exacerbated because it can not be determined with a sufficient degree of precision, either within the buffer manager chip or within the formatter chip, the time at which the ECC chip is ready to send the first of the sequence of ECC items. With respect to reading from disk, there are issues as to providing a way within the buffer manager and a way within the ECC generator to determine the particular points in time that the data bus carries parallel-by-bit data items sent by the formatter to define the leading sub-block of a block to be written to disk. In sum, considering a bus structure as a candidate architectural feature of such a system presents a complex problem, particularly in the light of needs for a high data transfer rate, and for economy of use of integrated circuit pins and FIFO memories.

SUMMARY OF THE INVENTION

This invention is directed to a temporary bus master that is preferably embodied in an individual integrated circuit, and to a system and method in which it is used, and provides a solution to the complex problem arising where multiple sub-systems need to participate in communication of at least one sub-block of a block of data items.

The invention has various novel and advantageous features, whereby the invention can be defined in various ways. According to one definition of the invention, it resides in a temporary bus master for connection to share an asynchronous communication bus. The temporary bus master embodying the invention cooperates with a primary bus master and a permanent bus slave in a multimaster block transfer throughout leading and trailing sub-blocks of which the permanent bus slave operates in accord with request/acknowledge protocol by applying at least one request signal to a first conductor of the bus and responding to each of a consecutive sequence of acknowledge signals on a second conductor of the bus to participate in communication of each of a consecutive sequence of concurrently-applied parallel-by-bit data items carried by multiple other conductors defining a data bus of the bus. As to structure, the temporary bus master comprises means for selectively responding to each of a first predetermined number of acknowledge signals appearing on the second conductor to provide for copying each such parallel-by-bit data item concurrently carried by the data bus, whereby the leading sub-block is distributed to the temporary bus master on-the-fly as it is communicated between the primary bus master and the bus slave. Further, the temporary bus master includes means for selectively responding to request signals on the first conductor to apply a second predetermined number of acknowledge signals to the second conductor while participating in communication of each of the consecutive sequence of the parallel-by-bit data items concurrently carried by the data bus to define the trailing sub-block of the block.

Preferably, the temporary bus master includes state-defining means switchable between a first state corresponding to a bus-monitoring mode of operation and a second state corresponding to a bus-master mode of operation, and further includes means for switching the state-defining means. During the bus-monitoring mode, the means for switching responds to the receipt of a predetermine number of acknowledge signals for switching the state-defining means from the first state to the second state so that at the end of the leading sub-block entry is made into the bus-master mode for participating in communication of the trailing sub-block. According to a particularly preferred feature, the temporary bus master includes means for generating an array of data items on-the-fly as data items of the leading sub-block are copied, and the data items in the array are sequentially sent to the permanent bus slave as the trailing sub-block. This feature is particularly significant in the context of a disk controller in which error-correction codes need to be generated during a block transfer incident to a disk write operation.

The invention can also be defined as residing in a chip set for connection to share an asynchronous communication bus with a bus slave that operates in accord with request/acknowledge protocol during a block transfer operation by applying at least one request signal to a first conductor of the bus and responding to each of a consecutive sequence of acknowledge signals on a second conductor of the bus to receive each of a consecutive sequence of parallel-by-bit data items via multiple other conductors defining a data bus of the bus, the chip set comprises a primary bus master embodied in a first chip of the chip set, and a temporary bus master embodied in a second chip of the chip set. The primary bus master includes means for selectively responding to request signals on the first conductor to apply a first predetermined number of acknowledge signals to the second conductor while concurrently applying parallel-by-bit data items to the data bus to define a leading sub-block of a block. The temporary bus master includes means for selectively responding to each of the first predetermined number of acknowledge signals appearing on the second conductor to provide for copying each such parallel-by-bit data item concurrently appearing on the data bus, whereby the leading sub-block is distributed to both the temporary bus master and the bus slave. The temporary bus master further includes means responding on-the-fly as such copying occurs to generate an array comprising a second plurality of parallel-by-bit data items, and means for selectively responding to request signals on the first conductor to apply a second predetermined number of acknowledge signals to the second conductor while concurrently applying a sequentially selected one of the array of parallel-by-bit data items to the data bus to define a trailing sub-block of the block.

As described in detail below, and as recited in the appended claims, the invention can also be defined as residing in a system and in a method, and includes numerous novel and advantageous preferred features in addition to those summarized above.

DETAILED DESCRIPTION

To provide an example of the kind of system in which the present invention is advantageously used, there will be described with reference to FIG. 1 a disk drive controller system 1. Suitably, system 1 comprises a plurality of integrated circuits that are surface mounted on, and interconnected by printed conductors on, a printed circuit board for use in a personal computer equipped with an SCSI host adapter and an optical disk drive. ("SCSI" is an acronym for Small Computer System Interface, as defined by an ANSI standard.)

As for an interface with the host adapter, system 1 includes a SCSI bus 3 and a conventional SCSI bus controller 5. As for an interface with the optical disk drive, system 1 includes an ESDI 7 and a conventional formatter 9 that is used as a permanent bus slave in accord with this invention. ("ESDI" is an acronym for Enhanced Small Disk Interface, as defined by an industry standard that is under review by ANSI.)

A suitable integrated circuit for SCSI bus controller 5 is manufactured and sold by the assignee of this invention under the designation WD33C93A. A suitable integrated circuit for formatter 9 is manufactured and sold by the assignee of this invention under the designation ADS1000.

In accord with the ANSI standard, SCSI bus 3 has eighteen conductors of which nine are used as a control bus and nine are used as a data bus for carrying 8-bit parallel bytes together with an optional parity bit. In accord with the industry standard, ESDI 5 has seventeen conductors for carrying various commands and data signals, including serial-by-bit data signals written to and read from the optical disk drive.

The SCSI controller 5 is connected to a plurality of conductors that define a data path 11 for carrying parallel-by-bit data items. In system 1, data path 11 comprises nine conductors for carrying 8-bit bytes together with a parity bit. This is also the case for each other data path described below, including a data bus portion of an asynchronous communication bus described below. For convenience in describing how the various data paths are connected to various integrated circuits, reference will be made to a host side and to a disk side of an integrated circuit. For example, a transceiver 13 has a host side that is connected to data path 11, and has a disk side that is connected to a data path 15. The transceiver 13 is controlled by two control signals, viz, SBIWRT and SBIRD, to provide for bi-directional signal propagation such that data items can propagate from data path 11 to data path 15 while the SBIWRT signal is asserted, and can propagate from data path 15 to data path 11 while the SBIRD signal is asserted. These two control signals are supplied by a control logic unit 17 that also supplies other control signals, including a DSKRD control signal, a DSKWRT control signal, and a group of other control signals for performing chip select and similar control functions and that are collectively designated CONTROL. Suitably, control logic unit 17 is implemented by a conventional programmable logic array integrated circuit.

Data path 15 is also connected to several other integrated circuits. It is connected to the host side of a transceiver 19 that is controlled by the DSKWRT and DSKRD signals. It is also connected to a buffer RAM 21. It is also connected to a buffer manager 23 that is used to perform functions of a primary bus master in accord with this invention. A suitable integrated circuit for buffer manager 23 is manufactured and sold by the assignee of this invention under the designation ADS3570. The ADS3570 device, as presently configured, s adapted to be a permanent bus master and needs the support of other circuitry of system 1 to define a primary bus master. In this regard, the ADS3570 device as presently configured has an output means for applying logic-level voltages to a conductor so as to define acknowledge signals, and such output means are not internally controllable to provide a third state in which a high output impedance is presented to the conductor. As for suitable support circuitry, any of numerous integrated circuits can be used as a controlled buffer responsive to the acknowledge-signal output of buffer manager 23 to provide a three-state output; i.e., true, false, and high output impedance. In system 1, the ADS3570 device used to implement formatter 9 has a SEQOUT output pin on which it provides a control signal for the support circuitry.

Preferably, a buffer manager 23' (FIG. 2) in general like the ADS3570 device would be provided with such internally-controllable output means to define the primary bus master, and eliminate the need for the support of such other circuitry.

A data bus 25 is connected between the disk side of transceiver 19 and the host side of formatter 9. It is also connected to a temporary bus master 27 that incorporates novel and advantageous features in accord with this invention as more fully developed below after other subsystems are generally described to place the preferred embodiment of this invention in context.

The system 1 further includes a processor 29, a processor ROM 31, and a processor RAM 33. Suitably, processor 29 is a microprocessor manufactured and sold by various companies under the designation 80188, which is generally similar to the 8088 microprocessor described in the background section above. Internally, it is a 16-bit processor, but communicates 8-bit bytes one at a time, and does so by multiplexing 8 of its 20 address lines. It provides an address latch enable (ALE) control signal and other control signals for strobing write and read operations. These processor-generated control signals, together with processor-generated address signals are carried by conductors not shown to control logic unit 17 so that it can decode system-level commands. The processor 29 is connected to a processor bus that functionally comprises a processor address bus 35 and a processor data bus 37 (one set of eight conductors are multiplexed for use as data bus 37 and the eight least significant bits of an address). The processor 29 applies addressing signals to processor address bus 35 to address processor RAM 31 and processor ROM 33. The processor data bus 37 carries 8-bit bytes to and from processor 29.

The processor 29 uses processor data bus 37 to communicate with formatter 9, buffer manager 23, temporary bus master 27, processor RAM 31, processor ROM 33, and also, via a transceiver 39, with SCSI bus controller 5.

The direction in which bytes are propagated by transceiver 39 is controlled by two control signals, viz, SBICCS and CRD, that are produced by logic unit 17.

Figure 1:
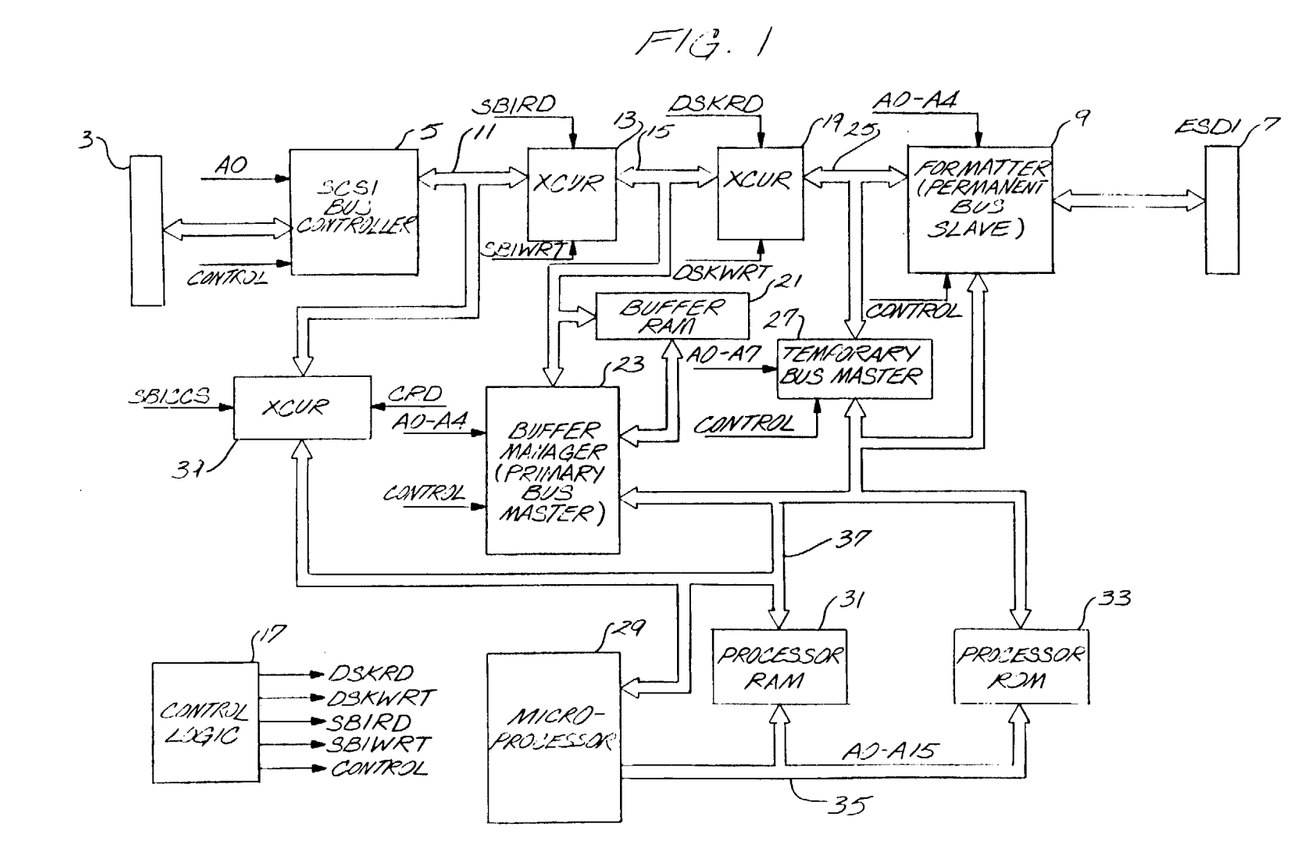
FIG. 1 is a general block diagram of a disk drive controller system in which the invention is used to perform various functions including appending a trailing sub-block of data items to a leading sub-block of data items to of block to be written onto a disk.

A system organized in accord with the general block diagram of FIG. 1 can operate in single host/single controller environments, as well as complex multiple host/multiple controller systems. It can be configured for parity or non-parity SCSI systems. Numerous ESDI optical disk drives can be attached to the system. Preferably, the system addresses all information on the disk according to logical block numbers. This allows an operating system to work with any of the widely varying ESDI drives that are commercially available, merely by specifying the total number of blocks available. The difference between one drive and another is specified by the total number of blocks. Simultaneous operation of multiple ESDI drives can be accomplished by storing each drive's parameters on a reserved track during track initialization (format). Thereafter, the system can automatically load each drive's parameter table into the system memory, and thereby eliminate the need for the host to specify drive parameters from power on.

With respect to data transfers between the host and system 1, SCSI bus controller 5 cooperates with data path 11, transceiver 13, data path 15, buffer RAM 21, and buffer manager 23 in a conventional manner. Suitably, buffer RAM 21 has 64K memory locations, each for storing 9 bits defining a byte and a parity bit. The SCSI bus controller 5 operates in DMA fashion in transferring data to and from the host. Because this relatively time-consuming task is handled directly by SCSI bus controller 5, processor 29 can simply supervise this task and substantial processing time is available for it to handle numerous other tasks involved in operation of a disk drive controller system.

Figure 2:
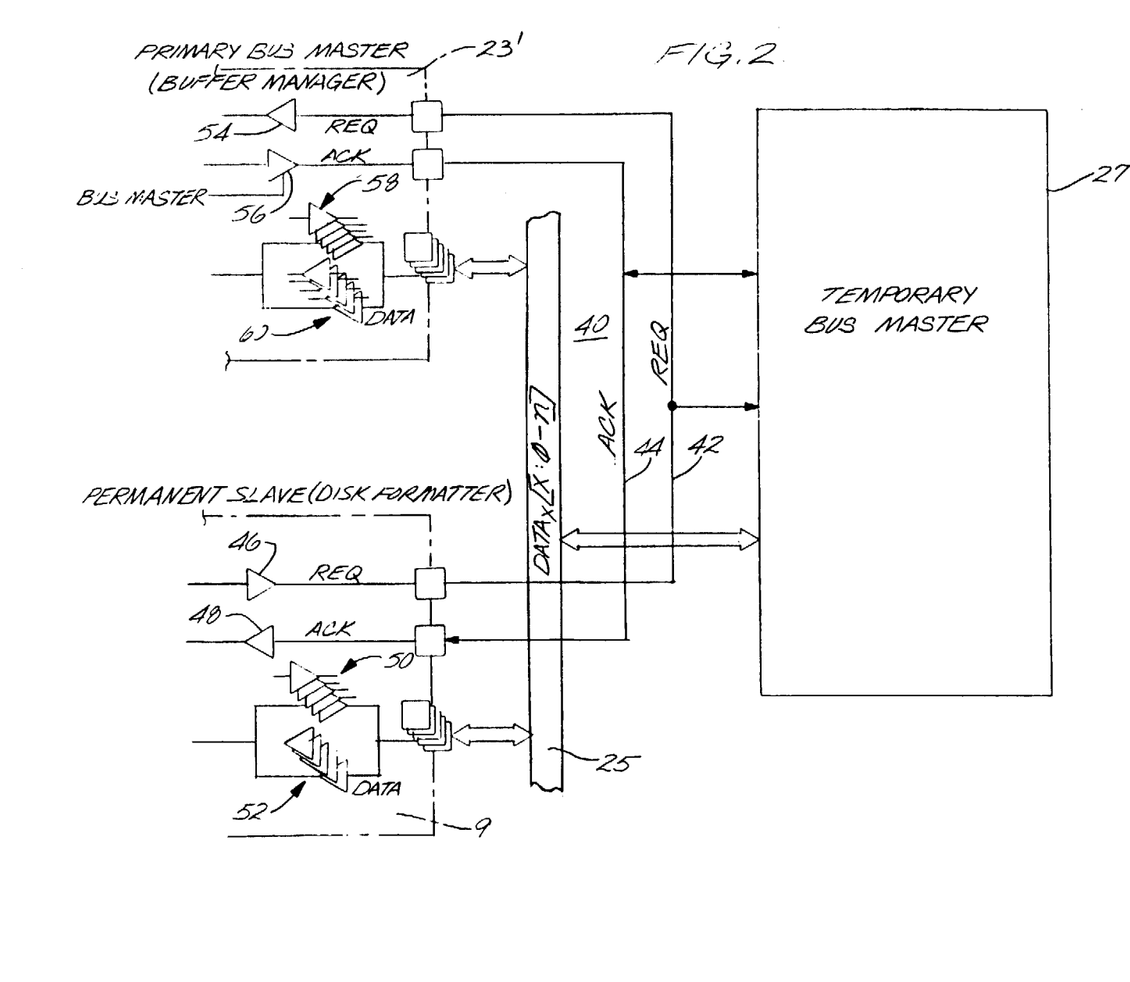
FIG. 2 is a block and schematic diagram showing certain features of a controller bus of the disk drive system, and certain features relating to connections made to share the controller bus in accord with this invention.

With reference to FIG. 2, data bus 25 forms part of an asynchronous communication bus 40 that also includes a conductor 42 for carrying request signals and a conductor 44 for carrying acknowledge signals.

The formatter 9 includes an output buffer circuit 46 for applying request signals to conductor 42, and includes an input buffer circuit 48 for responding to acknowledge signals carried by conductor 44. The formatter 9 further includes a set of output buffer circuits 50 for applying parallel-by-bit data items to data bus 25, and a set of input buffer circuits 52 for responding to data items carried by data bus 25. The formatter 9 operates as a permanent bus slave in accord with conventional request/acknowledge protocol both in burst and interlock modes of asynchronous communication.

With respect to burst mode, formatter 9 causes output buffer circuit 46 to assert a request signal on conductor 42 and maintain it asserted throughout an interval during which formatter 9 responds to a succession of acknowledge signals carried by conductor 44 and participate in communication of a succession of concurrently-defined, parallel-by-bit data items carried by data bus 25. With respect to interlock mode, the request and acknowledge signals occur in pairs; that is, for each request signal there is one ensuing acknowledge signal that occurs concurrently with a communicated data item. Insofar as the operation of formatter 9 is concerned, it operates as a bus slave regardless of the source of the acknowledge signals, and regardless of whether its participation in the communication involves sending or receiving the parallel-by-bit data items.

The buffer manager 23' includes an input buffer circuit 54 for responding to request signals carried by conductor 42. In accord with a feature that is particularly advantageous in the context of system 1, buffer manager 23' also includes a controlled output buffer circuit 56. A BUS MASTER signal is applied to output buffer circuit to control its operation. While the BUS MASTER signal is asserted, output buffer circuit 56 applies to conductor 44 a signal that can be in either binary state to provide for defining acknowledge signals carried by conductor 44. While the BUS MASTER signal is not asserted, output buffer circuit 56 presents a high output impedance such that it does not affect any signal applied to conductor 44 by temporary bus master 27. The buffer manager 23' further includes a set of output buffer circuits 58 for applying parallel-by-bit data items to data bus 25, and a set of input buffer circuits 60 for responding to data items carried by data bus 25. The buffer manager 23' operates as a primary bus master in accord with this invention to participate in communication of a leading sub-block, whether during writing or reading of data items to or from the disk.

Figure 3:
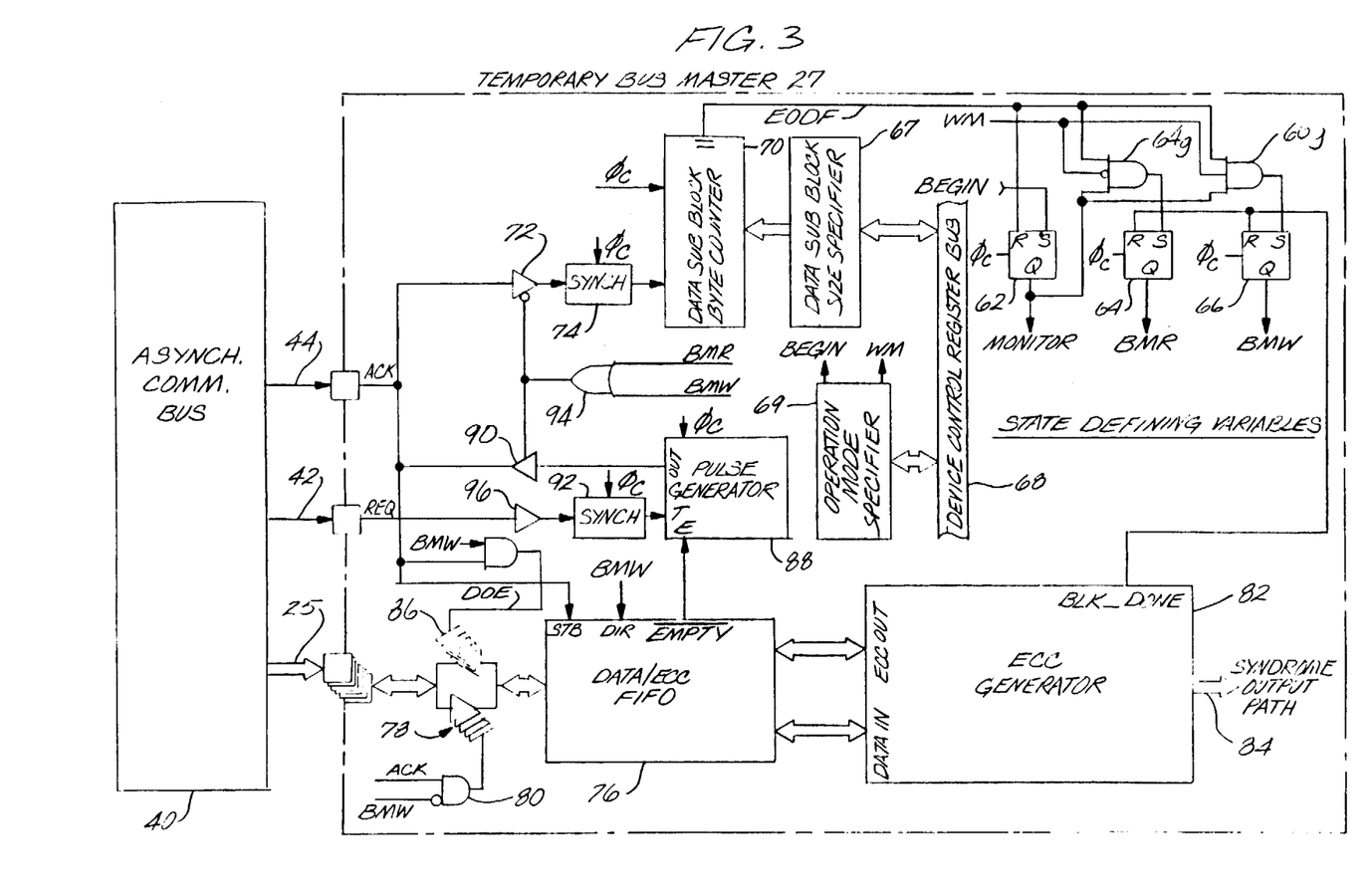
FIG. 3 is a block and schematic diagram showing certain features of an individual integrated circuit that constitutes a temporary bus master in the disk drive controller system.

With reference to FIG. 3, there will now be described the internal construction of temporary bus master 27, and how it is connected to share asynchronous communication bus 40 to cooperate with a primary bus master such as buffer manager 23', and with a permanent bus slave such as formatter 9 in a multi-master block transfer. During each such block transfer, there are defined in succession a leading sub-block and a trailing sub-block.

For a leading sub-block of a block transfer to write to the disk, buffer manager 23' responds to at least one request signal on conductor 42 by applying each consecutive data item of the leading sub-block to data bus 25, and by applying, concurrently with each data item, an acknowledge signal to conductor 44, so that formatter 9 receives it from buffer manager 23' in accord with conventional request/acknowledge protocol. Significantly, temporary bus master 27 makes an on-the-fly copy of each such data item as formatter 9 receives it from buffer manager 23. During the interval in which temporary bus master operates to make such copies, it is in a bus-monitoring state, which is one of three states defined by a state-defining means comprising three R-S flip-flops 62, 64, and 66. These flip-flops produce three signals that in combination constitute state-defining variables. Flip-flop 62 produces a monitoring (MONITOR) signal; flip-flop 64 produces a bus-master-read (BMR) signal; and flip-flop 66 produces a bus-master-write (BMW) signal.

For a leading sub-block of a block transfer to read from the disk, formatter 9 applies at least one request signal to conductor 42 and applies each consecutive data item of the leading sub-block in response to each acknowledge signal it detects on conductor 44, and buffer manager 23' receives it from formatter 9 in accord with conventional request/acknowledge protocol. Significantly, temporary bus master 27 makes an on-the-fly copy of each such data item as buffer manager 23' receives it from formatter 9. During the interval in which temporary bus master operates to make such copies, it is in the bus-monitoring state.

Every such leading sub-block comprises a predetermined number of data items, with the predetermined number being selectable in accord with a data sub-block size specifier stored in a device control register 67, which is one of numerous conventional device control registers connected to a device control register bus 68. As indicated in FIG. 1, temporary bus master 27 is connected to receive A0-A4 signals (the five least significant bits of an address generated by processor 29), and is connected to the CONTROL group of outputs of logic unit 17, and to processor data bus 37. Through these connections, processor 29 loads commands and control parameters into temporary bus master 27 in accord with conventional techniques. A register 69 stores an operation mode specifier so loaded into temporary bus master 27. A data sub-block byte counter 70 keeps track of the number of data items that have been copied into temporary bus master 27 while the leading sub-block is communicated between buffer manager 23' and formatter 9. Each acknowledge signal that buffer manager 23' applies to conductor 44 during transfer of the leading sub-block causes byte counter 70 to increment. In this regard, temporary bus master 27 includes a controlled input buffer circuit 72 and a synchronizing circuit 74 connected in tandem between conductor 44 and the input of byte counter 70. A clock signal $\phi_c$ is applied to synchronizing circuit 74 and various other circuits such as flip-flops 62, 64, and 66 to coordinate the timing of operations. In its presently preferred embodiment, temporary bus master 27 is implemented in CMOS technology and has clock-signal producing circuitry that produces two-phases in response to an input clock signal that can have a clock rate as high as 25 megahertz. The clock signal $\phi_c$ is also applied to byte counter 70, which has an "=" output on which it asserts an End-of-data-field (EODF) signal when the number of bytes counted equals the preset number stored in register 67.

Each data item that temporary bus master 27 so copies is loaded into a first-in, first-out (FIFO) memory 76. In this regard, temporary bus master 27 includes a controlled set of input buffer circuits 78 connected between data bus 25 and FIFO memory 76. A gate 80 controls the set of input buffer circuits 78. The gate 80 has two inputs; one responds to the acknowledge signals carried by conductor 44, and the other responds to the bus-master-write (BMW) signal produced by flip-flop 66. The output of gate 80 is true if the acknowledge signal is true and the BMW signal is false.

With respect to a trailing sub-block, this invention is applicable to a broad class of systems in which various information can be defined by the trailing sub-block. In system 1, the information defined by the trailing sub-block is used in performing error detection and correction in accord with Reed-Solomon error correction coding principles. During a block transfer to write to the disk, the trailing sub-block consists of a sequence of redundancy bytes (ECC codes and optional CRC codes) that are sent from temporary bus master 27 to formatter 9. During a block transfer to read from the disk, the trailing sub-block consists of the previously stored redundancy bytes, and they are sent from formatter 9 to temporary bus master 27. With regard to control of the state-defining means, register 69 asserts a BEGIN control signal to specify the beginning of a write transfer. This causes flip-flop 62 to be set upon the next clock pulse, whereupon the MONITOR signal becomes asserted. The MONITOR control signal is applied as one of three inputs to a gate 64g that participates in controlling three inputs to a gate 66g that participates in controlling the state of flip-flop 66. Each of the gates 64g and 66g also responds to a Write Mode (WM) control signal produced by register 69, and to the EODF signal. If the MONITOR control signal is true, and the WM signal is false, as is the case during the copying of the data items of a leading sub-block during a transfer to write to the disk, then when the EODF signal becomes true, gate 64g enables flip-flop 64 to be set upon the next ensuing clock pulse. If the MONITOR control signal is true, and the WM signal is true, as is the case during the copying of the data items of a leading sub-block during a transfer to read from the disk, then when the EODF signal becomes true, gate 66g enables flip-flop 66 to be set upon the next ensuing clock pulse. As to the resetting of flip-flops 64 and 66, a BLK_DONE signal is applied to the reset inputs of these flip-flops.

Because temporary bus master 27 copies the data items of the leading sub-block, whether in write mode or read mode, temporary bus master 27 can perform processing operations while the leading sub-block is being communicated between buffer manager 23' and formatter 9. During write mode, these processing operations generate ECC codes and, optionally, CRC codes to be sent as the trailing sub-block. During read mode, these processing operations generate syndromes that data processor 29 uses to produce offsets and masks for correcting errors in data items of the leading sub-block. As to sending the syndromes for use by processor 29, it is preferred but not essential that such syndromes be sent via processor data bus 37.

Circuitry for generating such ECC and CRC codes, and such syndromes can be designed in accord with principles taught in the prior art, and this invention does not reside in the specifics of such circuitry. Such circuitry is generally shown in FIG. 3 as ECC generator 82 connected between FIFO memory 76 and a syndrome output path 84.

Preferably, ECC generator 82 generates the Reed Solomon code with the coefficients from GF(256) with the generator polynomials of degree 4, 8, and 16. It also generates four bytes of GF(256) CRC code to detect miscorrections and to support extended correction up to sixteen bytes per interleave. The degree 16 polynomial and the CRC are the standard adopted by ANSI X3B11 Committee to be used for optical disk storage.

Using a degree 16 polynomial and 10 interleaves, ECC generator 82 supports correction up to 80 bytes per sector of data with only 160 bytes of ECC overhead (164 bytes if CRC is used).

The number of ECC bytes generated by ECC generator 82, per interleave, is equal to the degree of the polynomial. For example, when the degree 16 polynomial is used, with an interleave of 10, ECC generator 82 generates 160 ECC bytes. If the optional CRC bytes are also generated, the trailing sub-block involves 164 bytes in such case. During a transfer to read from the disk, syndrome bytes are generated by ECC generator 82; the number of such syndrome bytes is equal to the number of ECC bytes generated during the transfer to write to the disk. In either case, ECC generator 82 asserts the BLK_DONE signal upon completion of its generation of the bytes.

The data bytes of the leading sub-block propagate through FIFO memory 76 to a Data In input of ECC generator 82, and the redundancy bytes generated by ECC generator 82 propagate from an ECC Out output through FIFO memory 76 in the opposite direction. To control the direction of such propagation, FIFO memory 76 has a DIR input that responds to the BMW signal. While the BMW signal is false, thereby indicating that a leading sub-block copying operation is taking place, a strobe input of FIFO memory 76 responds to each acknowledge signal to add another data byte into the queue being propagated to ECC generator 82. While the BMW signal is true, thereby indicating that a trailing sub-block is being transferred, the strobe input of FIFO memory 76 responds to each internally-generated acknowledge signal to provide a byte to a controlled set of output buffer circuits 86 for application to data bus 25. As for such internal generation of acknowledge signals, temporary bus master 27 includes a pulse generator 88, and a controlled output buffer circuit 90. Pulse generator 88 has an Enable input connected to an $\overline{\text{EMPTY}}$ output of FIFO memory 76, a trigger input connected to the output of a synchronizing circuit 92, and an output that is connected to the input of buffer circuit 90. The control input of buffer circuit 90 is connected to the output of a NOR gate 94 which responds to the BMR and BMW signals. The synchronizing circuit 92 has an input that is connected to the output of a buffer circuit 96 that has an input connected to conductor 42 to receive request signals.

Figure 4:
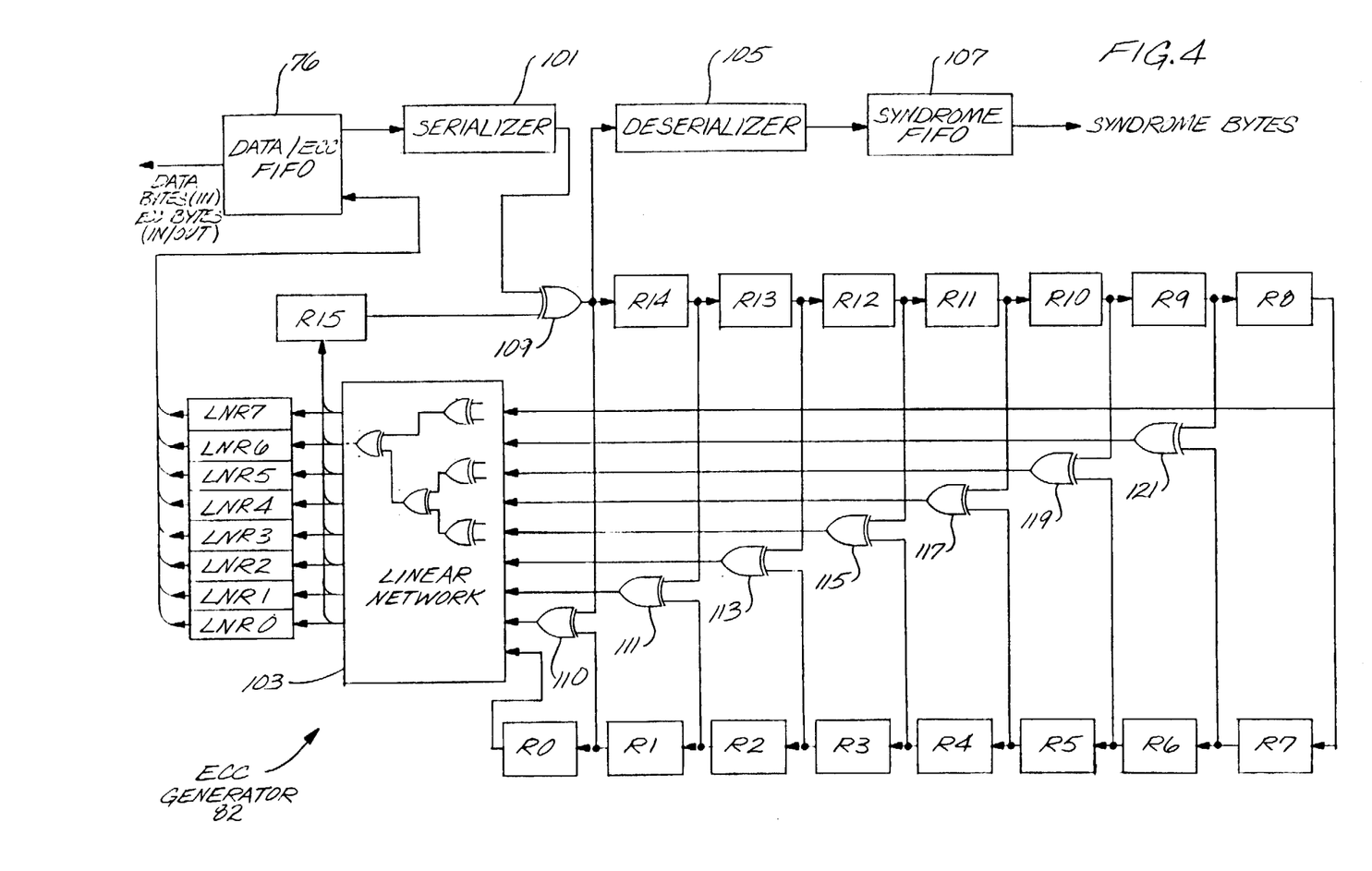
FIG. 4 is a general block diagram of a suitable implementation of a code-generator for producing ECC bytes to be transferred as a trailing sub-block to be written to disk, and for producing syndrome bytes to be transferred for use in effecting error correction of bits within bytes transferred as a leading sub-block upon reading from the disk.

With reference to FIG. 4, there will now be described a suitable arrangement of circuitry to implement ECC generator 82. The present invention does not reside in specific features of an ECC generator. Indeed, the ECC generating circuitry represented in FIG. 4 is similar to circuitry shown in a U.S. patent application, Ser. No. 06/895,034, titled "Reed-Solomon Code Encoder And Syndrome Generator Circuit," filed by Neal Glover on Aug. 8, 1986, the disclosure of which is hereby incorporated by reference. As indicated by the above-referenced patent application, there is a substantial body of published information directed to teaching how to make and use ECC generator circuitry. This includes patents such as U.S. Pat. No. 4,413,339 to Riggle and U.S. Pat. No. 4,410,989 to Berlekamp. It also includes a book titled *Practical Error Correction Design for Engineers*, by Neal Glover, Copyright 1982 (Version 1), published by Data Systems Technology Corporation, 1047 East Ninth Ave. #102, Broomfield, Colorado 80020.

As shown in FIG. 4, ECC generator 82 includes a serializer 101 that has a parallel input defining the Data In input of ECC generator 82 which is connected to FIFO memory 76. ECC generator 82 includes a Linear Network Register (LNR) comprising eight latches LNR0 through LNR7 that define a parallel output connected to an FIFO memory 76.

An ECC generator further includes a linear network 103, a shift register that comprises registers R15 through R0 and that is arranged to shift bits in a direction from the R15 register to the R0 register, a plurality of exclusive-OR gates, a de-serializer 105, and a syndrome FIFO memory 107.

A data byte at a time of the data bytes defining a leading sub-block is loaded into serializer 101. An exclusive-OR gate 109 receives the serial-by-bit output of serializer 101 and the serial-by-bit output of the R15 register. The output of exclusive-OR gate 109 is applied to the input of the R14 shift register, the input of de-serializer 105, and an exclusive-OR gate 110. The parallel-by-bit output of de-serializer 105 is applied to the input of syndrome FIFO memory 107.

The output of exclusive-OR gate 110 provides one of nine parallel-by-bit inputs to linear network 103. Another of these nine inputs is provided by the serial-by-bit output of the R0 register. Another of these inputs is provided by the serial-by-bit output of the R8 register. The remaining six of these inputs are provided by the outputs of exclusive-OR gates 111, 113, 115, 117, 119, and 121. The serial-by-bit inputs to these six gates are provided as follows: for gate 111, the outputs of the R14 register and the R2 register; for gate 113, the outputs of the R13 register and the R3 register; for gate 115, the outputs of the R12 register and the R4 register; for gate 117, the outputs of the R11 register and the R5 register; for gate 119, the outputs of the R10 register and the R6 register; and for gate 121, the outputs of the R9 register and the R7 register.

The block diagram of FIG. 4 subordinates numerous details to facilitate presentation of the basic arrangement of the circuitry forming ECC generator 82. Such details include multiplexers and control signal sources for cooperating with the multiplexers to control the number of shift register elements that participate in shifting bits around the shift register, in accord with a selected interleave factor. To provide for an interleave factor of 10, each of the registers R0 through R15 has 80 shift register elements. In an operation to generate codes or syndromes with an interleave factor of 1, only 8 of the 80 shift register elements per register participate in the shifting around the shift register.

As to linear network 103, it contains circuitry for performing finite field arithmetic functions. The particular finite field arithmetic functions to be performed depend upon the polynomial employed, and can be implemented by a combinatorial logic network of exclusive-OR gates. As noted in the above-referenced patent application filed by Neal Glover, such a combinatorial logic network can be replaced by a sequential network as illustrated in FIG. 21 of that patent application.

As for a representative case of operation involving an interleave factor of 1, each of the 16 registers R15 through R0 has eight shift register elements participating in the shifting. Up to 239 data bytes can be included in the leading sub-block, so that with a trailing sub-block of 16 ECC bytes there are 255 bytes in the entire block being transferred for writing on the disk. Data bytes propagating through FIFO memory 76 are converted into serial-by-bit format by serializer 101 so that a bit at a time is coupled into the shift register via exclusive-OR gate 109. The logical value of the output of exclusive-OR gate 109 depends not only on the logic value of the bit that is presently being coupled into the shift register but also is a function of bits that have propagated through the shift register. This is so because of the feedback paths from the registers through linear network 103 and into register R15. After 239 data bytes have propagated through FIFO memory 76, there is an array of 16 ECC bytes defined in the registers R15 through R0. These ECC bytes are loaded a byte at a time into FIFO memory 76 to propagate through it to be written onto the disk. During a transfer for a disk read, the syndromes are generated by ECC generator 82 in the same way the ECC bytes are generated during a transfer for a disk write. The syndromes can be loaded into the FIFO memory 76 if a choice is made to propagate the syndromes via data bus 25. Preferably, the syndromes propagate through syndrome FIFO memory 107 to a separate bus (i.e., bus 37 shown in FIG. 1) to facilitate operations carried out under control of processor 29 to generate masks and offsets for correcting erroneous bits in the leading sub-block of data transferred via data bus 25 from formatter 9.

The foregoing detailed description sets out preferred features of the invention and of the environment in which it is used. Because of the numerous new and advantageous features of the invention it can be considered as residing in a temporary bus master, or in a chip set including a temporary bus master and a primary bus master, or in a system, or in a method, as set forth below in the appended claims. Some of the advantages made possible by the architecture involved in using the invention are as follows. One such advantage is the on-the-fly generation of data items of a trailing sub-block. Because such generation is carried out on-the-fly, far less memory capacity needs to be provided for FIFO memory. For example, FIFO memory 76 is only four bytes deep in an embodiment of this invention.

We claim:

1. A temporary bus master having means by which to be connected through an asynchronous communication bus to a primary bus master and a permanent bus slave to cooperate with said master and slave in a transfer of a block of data items having a leading sub-block of data items followed by a trailing sub-block of data items, in which transfer the permanent bus slave operates in accord with request/acknowledge protocol by applying at least one request signal to a first conductor of the bus and responding to each of a consecutive sequence of acknowledge signals on a second conductor of the bus from said primary bus master to participate in communication of each of a consecutive sequence of concurrently-applied parallel-by-bit data items carried by multiple other conductors defining a data bus portion of the communication bus, the temporary bus master comprising:

means for selectively responding to each of a first predetermined number of acknowledge signals appearing on the second conductor and originating from said primary bus master during communication of the leading sub-block by copying each such parallel-by-bit data item concurrently carried by the data bus and constituting said leading sub-block, so that the leading sub-block is distributed to the temporary bus master as it is communicated between the primary bus master and the bus slave; and means for selectively responding to request signals on the first conductor by applying a second predetermined number, which is distinct from the first number of acknowledge signals, of acknowledge signals to the second conductor while participating in communication of each of the consecutive sequence of the parallel-by-bit data items concurrently carried by the data bus and constituting the trailing sub-block of the block.

2. A temporary bus master according to claim 1, wherein the means for selectively responding to the request signals includes means for applying, while concurrently applying an acknowledge signal, a parallelby-bit data item to the data bus to provide for sending the trailing sub-block of the block.

3. A temporary bus master according to claim 1, wherein the means for selectively responding to the request signals includes means for receiving, while concurrently applying an acknowledge signal, a parallel-by-bit data item from the data bus to provide for receiving the trailing sub-block of the block.

4. A temporary bus master having means by which to be connected through an asynchronous communication bus to a primary bus master and a permanent bus slave to cooperate with said master and slave in a transfer of a block of data items having a leading sub-block of data items followed by a trailing sub-block of data items, in which transfer the permanent bus slave operates in accord with request/acknowledge protocol by applying at least one request signal to a first conductor of the bus and responding to each of a consecutive sequence of acknowledge signals on a second conductor of the bus from said primary bus master to participate in communication of each of a consecutive sequence of concurrently-applied parallel-by-bit data items carried by multiple other conductors defining a data bus portion of the communication bus, the temporary bus master comprising:

- means for selectively responding to each of a first predetermined number of acknowledge signals appearing on the second conductor and originating from said primary bus master during communication of the leading sub-block by copying each such parallel-by-bit data item concurrently carried by the data bus and constituting said leading sub-block, so that the leading sub-block is distributed to the temporary bus master as it is communicated between the primary bus master and the bus slave;
- means for selectively responding to request signals on the first conductor by applying a second predetermined number, which is distinct from the first number of acknowledge signals, of acknowledge signals to the second conductor while participating in communication of each of the consecutive sequence of the parallel-by-bit data items concurrently carried by the data bus and constituting the trailing sub-block of the block;
- state-defining means switchable between a first state corresponding to a bus-monitoring mode of operation and a second state corresponding to a bus-master mode of operation; and
- means for switching the state-defining means into the bus-monitoring mode for copying the leading sub-block and into the bus-master mode for participating in communication of the trailing sub-block.

5. A temporary bus master according to claim 4, wherein the means for switching the state-defining means includes means for counting acknowledge signals.

6. A temporary bus master having means by which to be connected through an asynchronous communication bus to a primary bus master and a permanent bus slave to cooperate with said master and slave in a transfer of a block of data items having a leading sub-block of data items followed by a trailing sub-block of data items in which the permanent bus slave operates in accord with request/acknowledge protocol by applying at least one request signal to a first conductor of the bus and responding to each of a consecutive sequence of acknowledge signals on a second conductor of the bus from either said primary bus master or said temporary bus master to receive each of a consecutive sequence of concurrently-applied parallel-by-bit data items carried by multiple other conductors defining a data bus portion of the communication bus, the temporary bus master comprising:

- means for selectively responding to each of a first predetermined number of acknowledge signals appearing on the second conductor and originating from said primary bus master by copying each such parallel-by-bit data item concurrently appearing on the data bus, so that the leading sub-block is distributed to both the temporary bus master and the bus slave;
- means for generating an array comprising a second plurality of parallel-by-bit data items as such copying occurs; and
- means for selectively responding to request signals on the first conductor by applying a second predetermined number, which is distinct from the first number of acknowledge signals, define said concurrently-applied one of said data items as part of the trailing sub-block of the block.

7. A temporary bus master for use in a digital system having asynchronously-communicating sub-systems, including a primary bus master with means for generating acknowledge signals and a permanent bus slave that are interconnected by a bus having a first conductor for carrying request signals, a second conductor for carrying acknowledge signals, and multiple other conductors for carrying multi-bit data items between the primary bus master and the permanent bus slave, said multi-bit data items constituting a data item block within which certain data items are defined by said acknowledge signals to be a leading sub-block of said block, the temporary bus master comprising:

- state-defining means switchable between a first state corresponding to a bus-monitoring mode of operation and a second state corresponding to a bus-master mode of operation;
- data communications means including acknowledge-signal input means connected to the second conductor for receiving acknowledge signals over said second conductor from said primary bus master during the bus-monitoring mode of operation, and acknowledge-signal output means connected to the second conductor for transmitting acknowledge signals over said second conductor during the bus-master mode of operation;
- means responsive to the receipt of a predetermined number of acknowledge signals for switching the state-defining means from the first state to the second state so as to enter the bus-master mode of operation at the end of the leading sub-block;
- the data communication means further including means connected to the bus for providing, in cooperation with the acknowledge-signal output means, direct communication of a trailing sub-block of the block between the permanent bus slave and the temporary bus master; and
- means responsive to the transmission of a predetermined number of acknowledge signals for switching the state-defining means from the second state to the first state so as to re-enter the bus-monitoring mode of operation at the end of the trailing sub-block.

8. A temporary bus master according to claim 7, wherein the means that provides for direct communication with the permanent bus slave includes data-item input means and data-item output means so that such direct communication can be bi-directional.

9. A temporary bus master according to claim 8, wherein the acknowledge-signal input means and the data-item input means cooperate during the bus-monitoring mode so that the temporary bus master also receives each data item communicated between the primary bus master and the permanent bus slave.

10. A temporary bus master according to claim 9, and further comprising means for generating error-correction-code items in response to the receipt of the data items of the leading sub-block, and wherein the data-item output means communicates the error-correction items to the permanent bus slave via the bus.

11. A chip set for communicating over an asynchronous communication bus with a bus slave that operates in accord with request/acknowledge protocol during a block transfer operation by applying at least one request signal to a first conductor of the bus and responding to each of a consecutive sequence of acknowledge signals on a second conductor of the bus to receive each of a consecutive sequence of parallel-by-bit data items via multiple other conductors defining a data bus portion of the communication bus, the chip set comprising:

a primary bus master embodied in a first chip of the chip set;

a temporary bus master embodied in a second chip of the chip set;

the primary bus master including means for selectively responding to request signals on the first conductor to apply a first predetermined number of acknowledge signals to the second conductor while concurrently applying parallel-by-bit data items to the data bus to define a leading sub-block of a block;

the temporary bus master including means for selectively responding to each of the first predetermined number of acknowledge signals appearing on the second conductor by copying each such parallel-by-bit data item concurrently appearing on the data bus, so that the leading sub-block is distributed to both the temporary bus master and the bu salve; and further including means for generating an array comprising a second plurality of parallel-by-bit data items as such copying occurs, and means for selectively responding to request signals on the first conductor to apply a second predetermined number, which is distinct from the first number of acknowledge signals, of acknowledge signals to the second conductor while concurrently applying a sequentially selected one of the array of parallel-by-bit data items to the data bus to define a trailing sub-block of the block.

12. A chip set according to claim 11, wherein the means in the temporary bus master for selectively responding to request signals inlcudes means for applying while concurrently applying acknowledge signal, a parallel-by-bit data item to the data bus as for sending the trailing sub-block of the the block.

13. A chip set according to claim 12, wherein the temporary bus master further comprises means for generating an array of parallel-by-bit data items while such copying occurs, and means for selecting a consecutive one of the array of generated data items to send as the trailing sub-block of the block over said data bus.

14. A chip set according to claim 13, wherein the array comprises error-correction-code data items.

15. A chip set according to claim 11, wherein the means in the temporary bus master for selectively responding to the request signals includes means for receiving, while concurrently applying an acknowledge signal, a parallel-by-bit data item or the data bus to provide for receiving the trailing sub-block of the block.

16. A chip set according to claim 11, and further comprising state-defining means switchable between a first state corresponding to a bus-monitoring mode of operation and a second state corresponding to a bus-master mode of operation, and means for switching the state-defining means into the bus-monitoring mode for copying the leading sub-block and into the bus-master mode for participating in communication of the trailing sub-block.

17. A chip set according to claim 16, wherein the means for switching the state-defining means includes means for counting acknowledge signals.

18. A digital system for effecting a block transfer of parallel-by-bit data items that define leading and trailing sub-blocks of the data items, with the trailing sub-block of the data items having values that depend upon values of the data items of the leading sub-block, the digital system comprising:

an asynchronous communication bus including a first conductor for carrying request signals, a second conductor for carrying acknowledge signals, and multiple other conductors defining a data bus for carrying the parallel-by-bit data items;

a plurality of sub-systems connected to share the asynchronous communication bus and including a permanent bus slave, a primary bus master, and a temporary bus master;

the permanent bus slave including means for applying at least one request signal to the first conductor during the block transfer, and means for responding to each of a consecutive sequence of acknowledge signals on the second constructor to participate in communication of each of a consecutive sequence of concurrently-applied parallel-by-bit data items carried by the data bus during the block transfer;

the primary bus master including means for selectively responding to request signals on the first conductor to apply a first predetermined number of acknowledge signals to the second conductor while concurrently applying parallel-by-bit data items to the data bus, said acknowledge signals defining said data items as the leading sub-block;

the temporary bus master including means for selectively responding to each of the first predetermined number of acknowledge signals appearing on the second conductor by copying each such parallel-by-bit data item concurrently appearing on the data bus, so that the leading sub-block is distributed to both the temporary bus master and the bus slave; and further including means for generating an array comprising a second plurality of parallel-by-bit data items as such copying occurs, and means for selectively responding to request signals on the first conductor by applying a second predetermined number, which is distinct from the first number of acknowledge signals, of acknowledge signals to the second conductor while concurrently applying a sequentially selected one of the array of parallel-by-bit data items to the data bus, said second predetermined number of acknowledge signals serving to define the concurrently-applied one of the array of parallel-by-bit data items as part of the trailing sub-block of the block.

19. A temporary bus master having means by which to be connected through an asynchronous communication bus to a primary bus master and a permanent bus slave to cooperate with said master and slave in a transfer of a block of data items having a leading sub-block of data items followed by a trailing sub-block of data items, in which transfer the permanent bus slave operates in accord with request/acknowledge protocol by applying at least one request signal to a first conductor of the bus and responding to each of a consecutive sequence of acknowledge signals on a second conductor of the bus from said primary bus master to participate in communication of each of a consecutive sequence of concurrently-applied parallel-by-bit data items carried by multiple other conductors defining a data bus portion of the communication bus, the temporary bus master comprising:

(a) means for selectively responding to each of a first predetermined number of acknowledge signals appearing on the second conductor and originating from said primary bus master during communication of the leading sub-block by copying each such parallel-by-bit data item concurrently carried by the data bus and constituting said leading sub-block, so that the leading sub-block is distributed to the temporary bus master as it is communicated between the primary bus master and the bus slave;

(b) means for generating, while such copying occurs, an array of parallel-by-bit data items;

(c) means for selectively responding to request signals on the first conductor by applying a second predetermined number of acknowledge signals to the second conductor; and (d) means for selecting, and applying to said data bus concurrently with the application of said second predetermined number, which is distinct from the first number of acknowledge signals, of acknowledge signals to said second conductor, a consecutive one of the array of generated parallel-by-bit data items as the trailing sub-block of the block.

20. A temporary bus master according to claim 19, wherein the array comprises error-correction-code data items.

21. A temporary bus master embodied in a single integrated circuit chip and having means by which to be connected through an asynchronous communication bus to a primary bus master and a permanent bus sleeve to cooperate with said master and slave in a transfer of a block of data items having a leading sub-block of data items followed by a trailing sub-block of data items, in which transfer the permanent bus slave operates in accord with request/acknowledge protocol by applying at least one request signal to a first conductor of the bus and responding to each of a consecutive sequence of acknowledge signals on a second conductor of the bus from said primary bus master to participate in communication of each of a consecutive sequence of concurrently-applied parallel-by-bit data items carried by multiple other conductors defining a data bus portion of the communication bus, the temporary bus master comprising:

means for selectively responding to each of a first predetermined number of acknowledge signals appearing on the second conductor and originating from said primary bus master during communication of the leading sub-block by copying each such parallel-by-bit data item concurrently carried by the data bus and constituting said leading sub-block, so that the leading sub-block is distributed to the temporary bus master as it is communicated between the primary bus master and the bus slave;

means for selectively responding to request signals on the first conductor by applying a second predetermined number, which is distinct from the first number of acknowledge signals, of acknowledge signals to the second conductor while participating in communication of each of the consecutive sequence of the parallel-by-bit data items concurrently carried by the data bus and constituting the trailing sub-block of the block; and bi-direction buffer means for receiving acknowledge signals during the transfer of the leading sub-block and for applying the acknowledge signals during the transfer of the trailing sub-block.

* * * * *

UNITED STATES PATENT AND TRADEMARK OFFICE
CERTIFICATE OF CORRECTION

PATENT NO. : 5,062,044

DATED : October 29, 1991

INVENTOR(S) : Takashi Asami; Rajni N. Doshi

It is certified that error appears in the above-identified patent and that said Letters Patent is hereby corrected as shown below:

Column 1, line 53, after "As" insert -- a --.

Column 5, line 12, change "predetermine" to -- predetermined --.

Column 6, line 8, after "items to" delete "of" and inert --form a--.

Column 7, line 27, before "adapted" change "s" to -- is --.

Column 9, line 54, after "manager" change "23" to -- 23' --.

Column 11, line 9, before "three" insert -- the state of flip-flop 64. It is also applied as one of --.

Column 11, line 47, change "Reed Solomon" to -- Reed-Solomon --.

Column 12, lines 63,64, change "RO" to -- R0 -- (both occurrences).

Column 13, line 50, delete the spaces and bring the text flush with the margin.

UNITED STATES PATENT AND TRADEMARK OFFICE
CERTIFICATE OF CORRECTION

PATENT NO.  : 5,062,044
DATED       : October 29, 1991
INVENTOR(S) : Takashi Asami; Rajni N. Doshi It is certified that error appears in the above-identified patent and that said Letters Patent is hereby corrected as shown below:

Column 17, line 43, change "bu salve" to -- bus slave --.

Column 18, line 38, change "constructor" to
          -- conductor --.

Signed and Sealed this

Twenty-fifth Day of May, 1993

Attest:

MICHAEL K. KIRK

*Attesting Officer*    *Acting Commissioner of Patents and Trademarks*